Patented Mar. 7, 1939

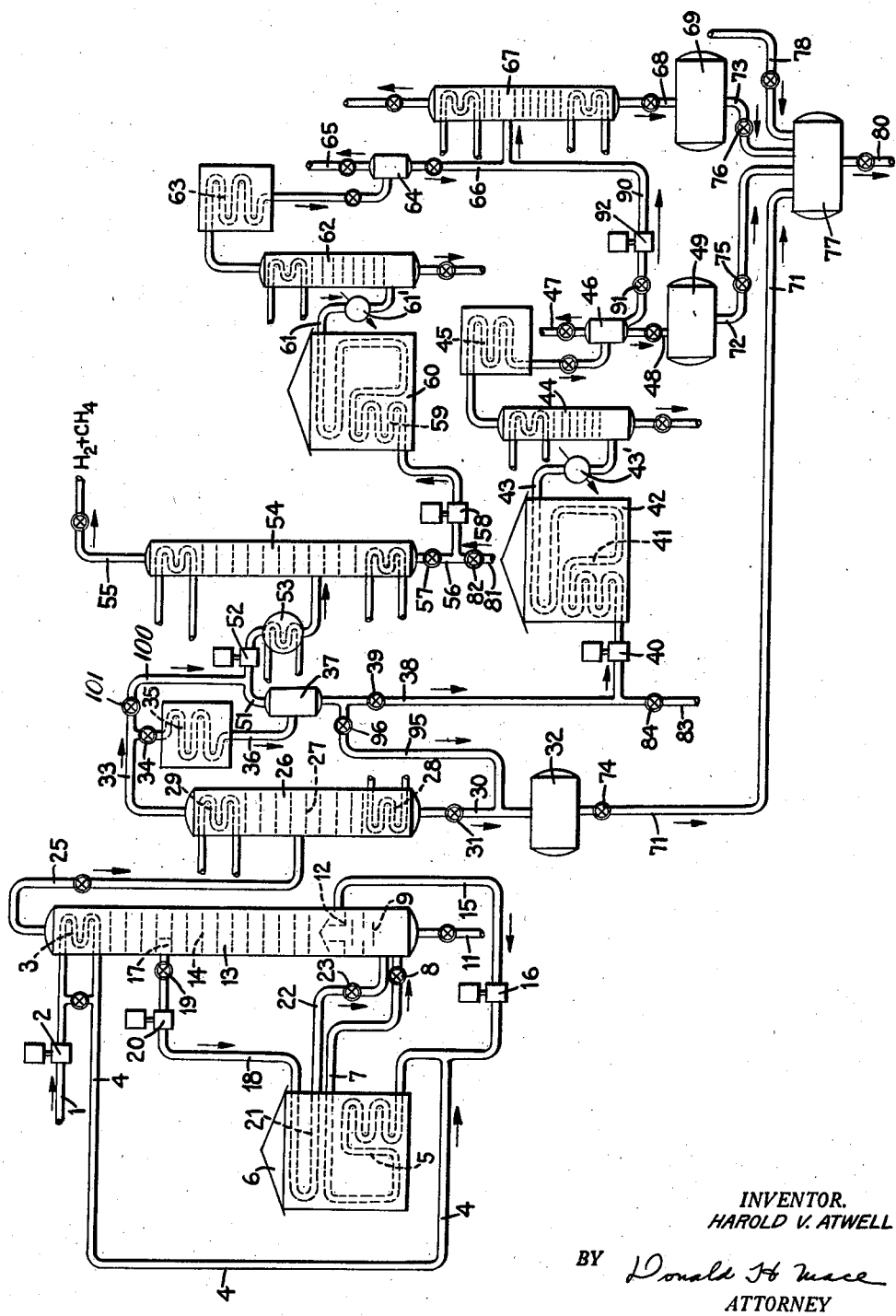

2,149,493

UNITED STATES PATENT OFFICE 2,149,493

TREATMENT OF HYDROCARBONS

Harold V. Atwell, White Plains, N. Y., assignor to Process Management Company, Inc., New York, N. Y., a corporation of Delaware Application November 1, 1934, Serial No. 750,972

13 Claims. (Cl. 196—10)

My invention relates to the treatment of hydrocarbons, and more particularly to the polymerization of gaseous olefins such as are contained in gases produced in cracking of hydrocarbon oils.

When hydrocarbon oils such as gas oil, reduced crude and the like are subjected to pyrolytic conversion for the purpose of producing gasoline, considerable quantities of normally gaseous materials are also produced. Thus, cracking-plant gases ordinarily contain varying amounts of hydrogen, methane, ethylene, ethane, propylene, propane, butylene and butane. Hydrocarbons of higher molecular weight such as pentane and higher-boiling compounds of both paraffinic and olefinic nature are normally included in the finished gasoline, which may also contain varying amounts of butane, butylene, propane and propylene, depending upon the degree of stabilization and permissible vapor pressure.

The relative quantities of paraffins and olefins are determined largely by the conditions under which the oil is cracked but modern processes involving vapor-phase operation at high temperatures tend to produce gasoline and gases containing relatively large amounts of olefins.

It has previously been proposed to subject cracking-plant gases to conversion for the purpose of polymerizing normally gaseous olefins to low-boiling normally liquid hydrocarbon oils suitable for use as motor fuel, with or without preliminary fractionation and/or thermal conversion to obtain gases for the polymerization operation which are more highly concentrated in olefinic constituents, and the hydrocarbon oils thus produced have been found to be especially advantageous in that they are possessed of extremely high anti-knock value when used as motor fuel.

It is an object of my invention to provide a process in which normally gaseous hydrocarbons may be advantageously subjected to polymerization conditions for the purpose of producing motor fuel of high anti-knock value, well balanced in constituents, that is to say, having a favorable distribution of constituents boiling at different points throughout the desired motor-fuel boiling-point range, and in which constituents which contribute to the anti-knock value of the finished fuel are properly distributed within the boiling range of the entire product.

My invention has for a second object the provision of a process in which cracked gasoline is recovered from cracked vapors in such manner as to leave in the gaseous or vaporous state constituents especially suitable for polymerization, and in which various components of such gases are subjected to polymerization under individually optimum conditions for the production of motor-fuel products of valuable character and suitable for blending with the cracked gasoline.

My invention has for further objects such additional operative advantages and improvements as may hereinafter be found to obtain.

Broadly, my invention contemplates the fractionation of cracked gases and vapors resulting from the pyrolysis or hydrocarbon oil to recover therefrom a gasoline condensate, followed by polymerization of residual gases to normally liquid low-boiling products suitable for blending with said gasoline condensate to produce a balanced motor fuel of superior anti-knock value.

My invention further contemplates fractionation of said cracked gases and vapors in such manner as to leave uncondensed a considerable portion of the lower-boiling products normally included in cracked gasoline, boiling for example up to 200° F., and the subsequent polymerization of these constituents to produce heavier products suitable for blending with said gasoline condensate, and in a preferred embodiment further contemplates the operation of the oil-cracking unit and its associated fractionating stages to recover a cracked gasoline condensate having not only a high initial boiling point but also an end point lower than is desired for the final motor fuel product, for example about 300° F. suitable for blending with other products produced in the process.

My invention further contemplates, as a preferred form of operation, the separation of the uncondensed gases and vapors into three fractions, one comprising primarily hydrogen and methane which are unsuitable for polymerization, and including some or all of the ethane present, another comprising principally propylene and propane but optionally containing considerable quantities of ethylene and ethane, and the third relatively concentrated in butylene, butane and higher-boiling hydrocarbons, followed by polymerization of the propylene fraction to produce a motor-fuel product consisting largely or primarily of relatively light or low-boiling constituents boiling principally below 200° F. and polymerization of the heavier fraction to produce a motor-fuel product relatively rich in higher-boiling constituents, which motor fuel products may be blended together and, if desired, with said gasoline condensate to produce a balanced motor-fuel product of proper boiling-point range and superior anti-knock value.

In order that my invention may be clearly set forth and understood, I now describe, with reference to the accompanying drawing illustrating and forming a part of this specification, various preferred forms and manner in which my invention may be practiced and embodied. In this drawing the single figure is a more or less diagrammatic elevational view of apparatus for carrying out the process of my invention in a preferred embodiment, the view being primarily intended to serve as a flow diagram illustrative of my process.

Referring to the figure, I have illustrated an oil-cracking system of more or less conventional design, serving as a source of cracked vapors. Hydrocarbon oil to be cracked, such as gas oil, or reduced crude, enters the system through a line 1, wherein is located a pump 2, and in the instance shown passes by way of a heat-exchange coil 3 and a line 4 to a cracking coil 5 located in a furnace 6, where the oil is subjected to suitable temperatures and pressures of for example from 850° to 1000° F. and from 50 to 1000 pounds per square inch, to effect pyrolysis of the oil.

The hot cracked products pass through a transfer line 7 having a pressure-reducing valve 8 into an evaporator 9, where a separation of volatile and residual products takes place, residual oil or tar being withdrawn through a valved line 11 while vapors pass through a trap-out tray 12 into a fractionator 13.

In the fractionator 13, wherein are located suitable plates or trays 14 and the heat-exchange coil 3, constituents heavier than the desired gasoline condensate are condensed, a portion or all of these passing by way of a line 15, wherein is located a pump 16, to the coil 5 as recycle stock.

The fractionator 13 may be so operated as to pass overhead vapors having an end point of from 400° to 450° F., but in the preferred instance, is so operated as to condense constituents boiling above say 300° F. for re-cracking. A portion or all of the constituents boiling between 300° F. and 450° F. may be withdrawn from an intermediate level of the tower 13 by means of a weir 17, and may be passed through a line 18, wherein are located a valve 19 and a pump 20 to a heating coil 21 located, for example, in the furnace 6, to be cracked therein at a temperature higher than that maintained in the coil 5, for example from 900° to 1100° F. under a suitable pressure, for example 200 pounds per square inch. The hot cracked products then pass through a transfer line 22, having a pressure-reducing valve 23 to the evaporator 9. When operating in this manner, the gasoline produced, while of low end-point, is of high anti-knock value, and the production of gases and low-boiling gasoline hydrocarbons is materially increased. This low end-point gasoline may be blended with heavier products of polymerization, as described herein, and, if desired, also with lighter products, to produce the final motor-fuel product.

The fractionated vapors and gases withdrawn from the top of the fractionating tower 13 pass through a vapor line 25 to a partial condenser or rectifier 26 which is interiorly provided with suitable plates or trays 27, a heating coil 28 and with a cooling coil 29. The operation of the rectifier 26 is preferably so regulated as to effect the condensation and separation of a cracked gasoline distillate relatively or entirely deficient in lower-boiling constituents, boiling for example below 200° F., which are normally included in cracked gasoline.

The condensed and rectified cracked gasoline is withdrawn from the bottom of the rectifier 26 through a line 30 having a valve 31 and passes to a receiver 32, while overhead gases and vapors pass through a line 33 having a valve 34 to a condenser 35 so operated as to effect the condensation of butane, butylene and other light constituents ordinarily included in the gasoline condensate.

As a result of the foregoing treatment, a separation is made between the normally gaseous hydrocarbons, which are not suitable for inclusion in gasoline, and low-boiling normally liquid hydrocarbons which are ordinarily included in gasoline without further treatment. This separation need not be perfect since both fractions are to be subjected to polymerization, for which purpose a charging stock of strictly defined composition is not essential. For example, the gaseous fraction will contain most of the propane and propylene as well as practically all of the lighter hydrocarbons but will include some butane and butylene and probably traces of higher hydrocarbons. The liquid fraction separated at 37 comprises the bulk of the butane and butylene as well as considerable quantities of higher-boiling hydrocarbons but will include some propane and propylene, and probably traces of even lower-boiling hydrocarbons. The end-point of the liquid fraction as determined by an Engler distillation will be governed by the quantity and character of the gaseous fraction which in turn determines the quantity of relatively low-boiling liquid which is later obtained by polymerization thereof, and also by the extent to which it is desired to produce relatively high-boiling hydrocarbons by the polymerization of the liquid fraction separated at 37. Ordinarily the boiling range of this liquid fraction will be about 50° F. to about 200° F. although it will be recognized that the initial boiling point will vary considerably depending on its content of hydrocarbons in the general boiling range of propane and butane. Likewise the end boiling point may range from 150° to 250° F. depending on the requirements pointed out above and also the sharpness of the fractionation accomplished in the rectifier 26.

It will be understood by those skilled in the art that the conditions under which the cracking of the oil takes place, as in the coil 5, will have a considerable effect not only upon the amount of gases produced but also upon the character and composition of these gases. Thus, relatively high oil-cracking temperatures tend to cause the production of relatively large quantities of relatively high olefinic gases. The quantity of the products obtained by the polymerization of these gases will likewise vary, and since these products of polymerization are subsequently to be blended with the cracked gasoline fraction to produce a balanced motor-fuel product, it will be clear that the boiling range of the products separated at 30 and 38 should be modified accordingly. Thus, in instances where relatively large amounts of normally gaseous constituents are produced or where the gases contain relatively large amounts of normally gaseous olefins, the rectifier 26 is preferably so operated as to condense and recover at this point a gasoline fraction having a relatively high initial boiling point, the fraction recovered at 37 having a correspondingly high end boiling point.

Gases and condensate pass from the condenser 35 through a line 36 into a gas separator 37 from which condensate is withdrawn through a line 38 having a valve 39. The condensate thus obtained passes through the line 38 to a pump 40 and thence through a pipe-coil 41 located in a suitable furnace 42, wherein it is subjected to elevated temperature and pressure effective to promote polymerization of butylene and higher-boiling olefins to normally liquid products within a motor-fuel boiling range of, for example, from 100° to 400° F., but comprising mainly constituents boiling above 200° F. Thus, an important constituent of the polymerized products may comprise di-isobutylene, having a boiling point of approximately 216° F. and of extremely high anti-knock value.

The products from the coil 41 then pass through a transfer line 43, wherein is located a cooling device 43' of either the direct or indirect type, to a suitable fractionating tower 44, where any constituents heavier than the desired motor-fuel distillate are removed, and thence to a condenser 45 and a separator 46, from which unpolymerized or residual gases may be withdrawn through a valved line 47 while liquid products of polymerization comprising motor fuel of the character indicated pass through a valved line 48 to a receiver 49.

Gases and vapors escaping from the separator 37 and comprising hydrogen, methane, ethane, ethylene, propane and propylene, as well as small amounts of butane and butylene, pass through a line 51 to a compressor or pump 52, where they are suitably compressed, for example to a pressure of from 200 to 500 pounds per square inch, and preferably about 300 to 350 pounds per square inch. The compressed products then pass through a cooler 53, where they may be cooled to approximately 100° F. or less, and thence into a rectifier or stabilizer 54 of conventional design. The purpose of the rectifier or stabilizer 54 is to remove hydrogen and methane as completely as possible. Various types of fractionators and stabilizers may be used, or an absorption system in which a suitable solvent such as heavy naphtha is circulated through a cycle comprising an absorber and a stripper may supplement or take the place of the stabilizer 54. The fractionated or rectified gases, comprising principally hydrogen and methane, but optionally containing considerable quantities of ethane and ethylene as well, pass from the top of the stabilizer 54 through a valved exit line 55 and may be used as fuel in the process.

Bottoms from the stabilizer 54, comprising principally propylene and propane, together with some butane and butylene and varying amounts of ethylene and ethane, as desired, are withdrawn by means of a line 56 having a valve 57 and delivered by means of a pump 58 to a pipe coil 59 located within a suitable furnace 60. The hydrocarbons passing through the coil 59 are subjected to suitable elevated pressures and temperatures to effect polymerization of propylene as well as butylene and ethylene to low-boiling normally liquid products of a motor-fuel character but composed principally of constituents having boiling points lying below about 200° F. The products from the coil 59 pass through a line 61, wherein is located a cooling device 61' of either direct or indirect type, to a fractionator 62 where any heavy polymers may be removed and thence to a condenser 63 and to a gas separator 64 from which unpolymerized or residual gases are withdrawn through a valved line 65 while the condensed liquid products pass through a valved line 66 to a stabilizer 67. The stabilized products then pass through a valved line 68 to a receiver 69.

By means of lines 71, 72 and 73, having valves 74, 75 and 76, respectively, liquid products from any two or from all three of the receivers 32, 49 and 69 may be withdrawn in any desired proportions and delivered to a blending tank 77, together if desired, with additional hydrocarbon distillate introduced through a line 78 from any convenient source (not shown), to form a balanced motor fuel having a satisfactory distribution of constituents of good anti-knock value over the desired motor fuel boiling-point range. The motor-fuel product thus obtained may be withdrawn for further treatment or for use as desired through a valved line 80.

The distillate introduced at 78 may, if desired, comprise straight-run gasoline distillate or may comprise cracked hydrocarbon distillate boiling over any portion of the normal motor-fuel boiling-point range.

With regard to the polymerization of gases effected in the coils 41 and 59, and the subsequent recovery of the polymerized products, it will be understood by those skilled in the art that various types of gas-polymerization processes and apparatus may be employed. Thus, for example, the apparatus may include soaking coils or soaking drums, as well as fractionating and stabilizing equipment of any suitable character as desired, the apparatus shown being intended merely to illustrate my process in a simplified form. Moreover, the polymerization of the gases and vapors in the coils 41 or 59 may be conducted under the influence of heat and pressure alone or in the presence of suitable catalysts. Where catalysts are not used, or where such catalysts are not employed for the purpose of reducing temperature and pressure requirements, temperatures of from 600° to 1000° F. and pressures of 500 to 3000 pounds per square inch or even higher may be employed, although it may be observed that the temperatures may vary as between coils 41 and 59 in accordance with optimum conditions for the different constituents being polymerized therein. For example, the temperatures employed for the polymerization of the relatively heavy fraction in coil 41 may be somewhat lower than those employed for the polymerization of the lighter fraction passed through the coil 59. This relation may, however, not hold true where different catalysts are employed in both stages which have varying effects upon the polymerization of butylene, propylene and ethylene and the like.

The gases withdrawn from separators 46 and 64 and the stabilizer 67, respectively, may, if desired, be withdrawn from the system. Alternatively, however, these gases, or any portion thereof, may be recycled either to the gas fractionator or stabilizer 54, and prior to such recycling the streams of gases from the separators 46 and 64 are preferably subjected to elevated temperatures, for example from 1250° to 1750° F., preferably under pressures not in excess of 200 pounds per square inch, to effect cracking of paraffinic constituents to form gaseous olefins suitable for further polymerization.

Normally gaseous or low-boiling hydrocarbons from any outside source may be introduced into the system as desired. Where such hydrocarbons comprise largely propane and propylene, or are relatively rich in these constituents, they may enter through a line 81 having a valve 82, for delivery to the coil 59. Where such hydrocarbons are relatively rich in butane, butylene or heavier hydrocarbons boiling up to 200° F. or thereabouts, they may enter through a line 83 having a valve 84, passing to the coil 41 for polymerization.

It should be emphasized at this point that while I have described my invention hereinabove with reference to particular constituents such as propylene and butylene, in order to illustrate the process with reference to present-day motor fuel requirements, it will be understood that where coils 41 and 59 are both employed for polymerization of separate fractions the separation of these fractions is not necessarily based upon any individual constituents but rather upon the relation of the various fractions and the products of their polymerization to the desired final product. In general, the constituents subjected to polymerization in the coil 59 will comprise olefinic gases and vapors, together with corresponding paraffins, having boiling points too low to be included in the desired final motor fuel product.

If desired, the polymerized liquid products separated at 46, instead of being delivered to the blending tank 49, may be delivered by means of a line 90 having a valve 91 and a pump 92 to the stabilizer 67 for stabilization, together with the products drawn from the separator 64. In this instance, the combined stabilized products from the two polymerization operations conducted at 41 and 59, respectively, are delivered to the receiver 69, from which they may be withdrawn as desired for delivery to the blending tank 77.

In some cases, it may happen that the separation at 37 of a fraction having an end-point as high as 200° F. may entail the separation at this point of larger quantities of low-boiling constituents than are desired to subject to polymerization in the coil 41. In this instance a portion of the fraction separated at 37 may be delivered by means of a line 95 having a valve 96 to the receiver 32, the amount of the light fraction thus delivered to the receiver 32 depending upon the balance of relatively high-boiling and low-boiling constituents obtained in the blending tank 77.

Moreover, it will be understood by those skilled in the art in place of the condenser 35 and separator 37 a rectifier similar to that shown at 26 may be employed where a sharper fraction is desired. Conversely, where it is not desired to sharply fractionate the initial and relatively heavy gasoline fraction delivered to the receiver 32, a conventional cooling coil and gas separator may be employed in place of the rectifier 26.

In some instances it may be desired not to separate the gases and vapors leaving the rectifier 26 into two fractions for separate polymerization but to effect polymerization of constituents heavier than methane in a single stream. In such case, the gases and vapors leaving the rectifier 26 through the line 33 may be delivered through a by-pass line 100 having a valve 101 to the line 51 on the inlet side of the compressor 52. In this instance, the valve 34 is closed and the coil 41 is not operated unless it be used for polymerization of constituents introduced from outside through the line 83.

It will be apparent from the above that my process is capable of several modifications. Thus, for example, as in the preferred instance, I may recover at 32 a fraction having a boiling range of from about 200° to about 300° F., a second fraction at 37 having a boiling range of from about 50° to 200° F. which is then polymerized to produce a product collected at 49 boiling between 200° and 400° F., and a third fraction from the fractionator 54 comprising constituents heavier than methane but lighter than said second fraction, which third fraction is polymerized to recover at 69 a relatively light liquid fraction boiling principally below 200° F. The products from the receivers 32, 49 and 69 are then blended together in any desired proportions to produce the final motor-fuel product at 77.

This procedure may be varied as indicated, however. For example, I may recover at 32 a product having a boiling range of from about 200° F. to about 400° F. The remaining vapors may be polymerized at 59 to recover a product collected in the receiver 69 suitable for blending with the gasoline collected at 32. Other variations are possible with the scope of the description given hereinabove, it being intended that the nature of the product recovered at 32 may be varied as indicated whether or not polymerization of the remaining gases and vapors is conducted in a single stream or in two separate streams.

My process makes possible the production of a blended motor fuel product exceptionally high in anti-knock value and containing a favorable balance and distribution of constituents throughout its boiling-point range. Not only does this product represent a materially increased yield over that obtained when the gases are not polymerized but it contains constituents such, for example, as di-isobutylene which are of higher anti-knock value than is true of such initial products of the oil-cracking operation, such as butane and butylene. My process therefore represents a desirable and advantageous procedure for recovering motor-fuel products from vapors produced in cracking of hydrocarbon oils.

While I have described and illustrated my invention hereinabove with respect to various specific illustrative examples, it will be understood by those skilled in the art that my invention is not limited to the details of such illustrative examples or to the details of the apparatus shown by way of illustration, but may variously be practiced and employed within the scope of the claims hereinafter made.

I claim:

1. The process of recovering normally liquid products suitable for use as motor fuel from cracked hydrocarbon vapors, which comprises partially condensing such vapors from which constituents heavier than gasoline have been removed to recover a cracked gasoline distillate deficient in constituents boiling below about 200° F., fractionating the remaining vapors and gases present therewith to recover therefrom a fraction relatively rich in hydrogen and methane, a fraction relatively rich in propylene and a heavier fraction, separately subjecting said propylene fraction and said heavier fraction to conditions effective to polymerize unsaturated constituents thereof to normally liquid hydrocarbon oils predominating, respectively, in constituents boiling within the lower and upper portions of a gasoline boiling-point range, recovering said hydrocarbon oils and blending them with said cracked distillate to form a balanced motor-fuel product of high anti-knock value.

2. A process of recovering normally liquid products suitable for use as motor fuel from cracked hydrocarbon vapors, which comprises partially condensing such vapors from which constituents heavier than gasoline have been removed to recover therefrom a gasoline distillate fraction deficient in constituents boiling below about 200° F. and constituents boiling above about 300° F., then fractionating remaining gases and vapors to recover therefrom a light second fraction containing light gasoline constituents boiling below about 200° F., a third fraction relatively rich in lighter gaseous constituents heavier than methane and a fourth fraction comprising largely hydrogen and methane, separately subjecting said light second gasoline fraction and said third fraction to conditions of elevated temperature and pressure effective to polymerize unsaturated constituents thereof to normally liquid hydrocarbon oils predominating, respectively, in constituents boiling within the lower and upper portions of a gasoline boiling-point range, recovering said hydrocarbon oils and blending them with said gasoline distillate fraction to form a motor-fuel product of high anti-knock value.

3. The process of manufacturing normally liquid low-boiling hydrocarbons suitable for use as motor fuel and of high anti-knock value from relatively high-boiling hydrocarbon oil which comprises subjecting said oil to conditions of temperature and pressure effective to crack the same, fractionating the resulting vapors to recover constituents heavier than gasoline, a heavy naphtha fraction and a gasoline fraction having an end boiling point below that of the final desired motor-fuel product, subjecting said heavy naphtha fraction to a more drastic temperature to crack the same and commingling the cracked vapors for fractionation with the vapors from the first-mentioned cracking operation, fractionally separating the gasoline fraction into a plurality of fractions, including a normally gaseous fraction substantially free from hydrogen and methane, a liquid fraction having a lower initial and end boiling point than those of the final desired motor-fuel product and a cracked distillate having a higher initial boiling point and a lower end boiling point than those of the final desired motor-fuel product, subjecting said normally gaseous fraction to conditions of pressure and temperature effective to polymerize constituents thereof to normally liquid gasoline-like products of high anti-knock value predominating in constituents boiling largely within the lower portion of the desired boiling point range of the final motor-fuel product, subjecting said first-mentioned liquid fraction to conditions of temperature and pressure effective to polymerize constituents thereof to gasoline-like products of high anti-knock value predominating in constituents boiling largely within the upper portion of the boiling point range of the desired final motor-fuel product, and recovering and blending said gasoline-like products resulting from the polymerization operations with said cracked distillate to form a balanced motor fuel of high anti-knock value.

4. The process of manufacturing normally liquid low-boiling hydrocarbons suitable for use as motor fuel and of high anti-knock value from relatively high-boiling hydrocarbon oil which comprises subjecting said oil to conditions of temperature and pressure effective to crack the same, fractionating the resulting vapors to recover constituents heavier than gasoline and a gasoline fraction having an end boiling point below that of the final desired motor-fuel product, fractionally separating the gasoline fraction into a plurality of fractions, including a normally gaseous fraction substantially free from hydrogen and methane, a liquid fraction having a lower initial and end boiling point than those of the final desired motor-fuel product and a cracked distillate having a higher initial boiling point and a lower end boiling point than those of the final desired motor-fuel product, subjecting said normally gaseous fraction to conditions of pressure and temperature effective to polymerize constituents thereof to normally liquid gasoline-like products of high anti-knock value predominating in constituents boiling largely within the lower portion of the desired boiling point range of the final motor-fuel product, subjecting said first-mentioned normally liquid fraction to conditions of temperature and pressure effective to polymerize constituents thereof to gasoline-like products of high anti-knock value predominating in constituents boiling largely within the upper portion of the boiling point range of the desired final motor-fuel product, and recovering and blending said gasoline-like products resulting from polymerization with said cracked distillate to form a balanced motor fuel of high anti-knock value.

5. The process of manufacturing normally liquid low-boiling hydrocarbons suitable for use as motor fuel and of high anti-knock value from relatively high-boiling hydrocarbon oil which comprises subjecting said oil to conditions of temperature and pressure effective to crack the same, fractionating the resulting vapors to recover constituents heavier than gasoline, a heavy naphtha fraction and a gasoline fraction having an end boiling point below that of the final desired motor-fuel product, subjecting said heavy naphtha fraction to a more drastic temperature to crack the same and commingling the cracked vapors for fractionation with the vapors from the first-mentioned cracking operation, fractionally separating the gasoline fraction into two or more fractions, including a light fraction comprising mainly normally gaseous constituents substantially free from hydrogen and methane and a cracked distillate having a higher initial boiling point and a lower end boiling point than those of the final desired motor-fuel product, subjecting the light fraction to conditions of temperature and pressure effective to polymerize constituents thereof to normally liquid gasoline-like products predominating in constituents having an initial boiling point and an end boiling point corresponding to those of the final desired motor-fuel product, recovering from the products of polymerization a polymer fraction having an initial boiling point and an end boiling point corresponding to those of the final desired motor-fuel product, and blending said cracked distillate and said polymer fraction to produce a balanced motor fuel of high anti-knock value.

6. The process of recovering normal liquid products suitable for use as motor fuel from cracked hydrocarbon vapors, which comprises partially condensing such vapors from which constituents heavier than gasoline have been removed to recover a cracked gasoline distillate deficient in constituents boiling below 200° F., fractionating the remaining vapors and gases to recover therefrom normally gaseous hydrocarbons relatively free from hydrogen and methane, subjecting said normally gaseous hydrocarbons to conditions of elevated temperature and pressure effective to polymerize same to normally liquid hydrocarbon oils predominating in constituents boiling below 200° F. within a gasoline boiling point range, recovering said hydrocarbon oils and blending them with said gasoline distillate to form a balanced motor-fuel product of high anti-knock value.

7. A process of recovering normally liquid products suitable for use as motor fuel from cracked hydrocarbon vapors, which comprises partially condensing such vapors from which constituents heavier than gasoline have been removed to recover therefrom a gasoline distillate fraction deficient in constituents boiling below about 200° F. and constituents boiling above about 300° F., then fractionating remaining gases and vapors to recover therefrom a light second fraction containing light gasoline constituents boiling below about 200° F., a third fraction relatively rich in lighter gaseous constituents heavier than methane and a fourth fraction comprising largely hydrogen and methane, subjecting said light second gasoline fraction and said third fraction to conditions of elevated temperature and pressure effective to polymerize unsaturated constituents thereof to normally liquid hydrocarbon oils predominating, respectively, in constituents boiling within the lower and upper portions of a gasoline boiling-point range, recovering said hydrocarbon oils and blending them with said gasoline distillate fraction to form a motor-fuel product of high anti-knock value.

8. A process of recovering normally liquid products suitable for use as motor fuel from cracked hydrocarbon vapors, which comprises partially condensing such vapors from which constituents heavier than gasoline have been removed to recover therefrom a gasoline distillate fraction deficient in constituents boiling below about 200° F., then fractionating remaining gases and vapors to recover therefrom a light second fraction containing light gasoline constituents boiling below about 200° F., a third fraction relatively rich in lighter gaseous constituents heavier than methane, subjecting said light second gasoline fraction and said third fraction to conditions of elevated temperature and pressure effective to polymerize unsaturated constituents thereof to normally liquid hydrocarbon oils predominating, respectively, in constituents boiling within the lower and upper portions of a gasoline boiling-point range, recovering said hydrocarbon oils and blending them with said gasoline distillate fraction to form a motor-fuel product of high anti-knock value.

9. The process of manufacturing normally liquid low-boiling hydrocarbons suitable for use as motor fuel and of high anti-knock value from relatively high-boiling hydrocarbon oil which comprises subjecting said oil to conditions of temperature and pressure effective to crack the same, fractionating the resulting vapors to recover constituents heavier than gasoline and a gasoline fraction, fractionally separating the gasoline fraction into two or more fractions, including a light fraction comprising mainly normally gaseous constituents and a cracked gasoline distillate deficient in constituents boiling below about 200° F., subjecting the light fraction to conditions of temperature and pressure effective to polymerize constituents thereof to normally liquid gasoline-like products having sufficient constituents boiling below about 200° F. to supply the deficiency of low-boiling constituents in said cracked gasoline distillate, recovering from the products of polymerization said normally liquid gasoline-like products and blending cracked gasoline distillate and normally liquid gasoline-like products thus obtained to produce a balanced motor fuel of high anti-knock value.

10. The process of recovering normally liquid products suitable for use as motor fuel from cracked hydrocarbon vapors, which comprises partially condensing such vapors from which constituents heavier than gasoline have been removed to separately recover a cracked gasoline distillate deficient in constituents boiling below 200° F. and normally gaseous hydrocarbons, subjecting said normally gaseous hydrocarbons to conditions of elevated temperature and pressure effective to polymerize same to normally liquid hydrocarbon oils having sufficient constituents boiling below 200° F. within a gasoline boiling point range to supply the deficiency of low boiling constituents in said cracked gasoline distillate, recovering said hydrocarbon oils and blending them with said gasoline distillate to form a balanced motor-fuel product of high anti-knock value.

11. In a process for the conversion of hydrocarbon material, the method which comprises, subjecting hydrocarbons to conversion conditions of temperature and pressure to form a gasoline distillate, subjecting said distillate to stabilization, removing from said distillate substantially all of its hydrocarbons having less than 5 carbon atoms, thereby forming a distillate of lower vapor pressure than commercial gasoline, subjecting hydrocarbons of less than 5 carbon atoms evolved by the stabilization to polymerization to produce gasoline polymers therefrom, stabilizing the resulting polymer products to a higher vapor pressure than said distillate to retain a substantial proportion of 4 carbon atom hydrocarbons therein, and blending the thus stablized polymer products of relatively high vapor pressure with said distillate of lower vapor pressure than commercial gasoline to form a product of about the volatility of commercial gasoline.

12. In a process for the conversion of hydrocarbon material, the method which comprises subjecting hydrocarbons to conversion conditions of temperature and pressure to form a gasoline distillate, subjecting said distillate to stabilization to remove therefrom substantially all of its hydrocarbons having less than 5 carbon atoms, thereby forming a distillate of lower vapor pressure than commercial gasoline, subjecting hydrocarbons of less than 5 carbon atoms evolved by the stabilization to polymerization to produce gasoline polymers therefrom, stabilizing the resulting polymer products to a higher vapor pressure than said distillate to retain in said polymer products a substantial proportion of hydrocarbons more volatile than those retained in said distillate, and blending the thus stabilized polymer products of relatively high vapor pressure with said distillate of lower vapor pressure than commercial gasoline to form a product of about the volatility of commercial gasoline.

13. In a process for the conversion of hydrocarbon material, the method which comprises subjecting hydrocarbons to conversion conditions of temperature and pressure to form a gasoline distillate, separating substantially all of the hydrocarbons having less than 5 carbon atoms from said distillate, thereby forming a distillate of lower vapor pressure than commercial gasoline, subjecting hydrocarbons of less than 5 carbon atoms thus separated to polymerization to produce gasoline polymers therefrom, stabilizing the resulting polymer products to a higher vapor pressure than said distillate to retain in said polymer products a substantial proportion of hydrocarbons more volatile than those retained in said distillate, and blending the thus stabilized polymer products of relatively high vapor pressure with said distillate of lower vapor pressure than commercial gasoline to form a product of about the volatility of commercial gasoline.

HAROLD V. ATWELL.